(12) United States Patent
Cho

(10) Patent No.: US 6,975,567 B2
(45) Date of Patent: Dec. 13, 2005

(54) METHOD AND APPARATUS FOR COPYING/MOVING DATA ON OPTICAL RECORDING MEDIUM

(75) Inventor: Se Jin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 298 days.

(21) Appl. No.: 10/013,272

(22) Filed: Dec. 10, 2001

(65) Prior Publication Data

US 2002/0080691 A1 Jun. 27, 2002

(30) Foreign Application Priority Data

Dec. 27, 2000 (KR) .............................. 2000-83091

(51) Int. Cl.[7] .............................................. G11B 7/004
(52) U.S. Cl. .............................. 369/47.12; 369/47.13; 369/47.34
(58) Field of Search .................... 369/47.12, 47.13, 369/47.31, 47.34

(56) References Cited

U.S. PATENT DOCUMENTS

| | | | |
|---|---|---|---|
| 5,541,902 A | * | 7/1996 | Ten Kate ................. 369/47.13 |
| 5,586,093 A | * | 12/1996 | Honda et al. ............. 369/47.13 |
| 5,995,471 A | * | 11/1999 | Saoyama et al. ......... 369/47.13 |
| 6,453,395 B1 | * | 9/2002 | Gehr .......................... 711/162 |

FOREIGN PATENT DOCUMENTS

| | | |
|---|---|---|
| JP | 7-210332 | 8/1995 |
| JP | H10-222930 | 8/1998 |
| JP | P2000-322826 A | 11/2000 |
| JP | 2000-357386 | 12/2000 |

* cited by examiner

Primary Examiner—Brian E. Miller
Assistant Examiner—Michael V. Battaglia
(74) Attorney, Agent, or Firm—Lee, Hong, Degerman, Kang & Schmadeka

(57) ABSTRACT

A method and apparatus for copying/moving data on an optical recording medium is disclosed, in which data moves or copies in one disc using a memory and data transmission to a host is omitted when the data moves or copies in one optical disc. To this end, identification information is assigned to a reserved area of read/write commands generated from the host, thereby displaying data movement status or data copying status. Thus, it is possible to reduce the data transmission time when the data moves or copies in one disc. Furthermore, even if the read/write commands in one file or the whole data to move or copy occur several times, the data transmission time such as the data movement time and the data copying time can be reduced by reducing the number of physical access times of the optical disc for the data reading/writing operation.

21 Claims, 6 Drawing Sheets

| byte \ bit | 7 | 6 | 5 | 4 | 3 | 2 | 1 | 0 |
|---|---|---|---|---|---|---|---|---|
| 0 | Operation code(28h) | | | | | | | |
| 1 | LUN(0bolute) | | | DPO(0) | FUA | Reserved | | RelAdr |
| 2 | MSB | | | | | | | |
| 3 | Logical Block Address | | | | | | | |
| 4 | | | | | | | | |
| 5 | | | | | | | | LSB |
| 6 | Reserved | | | | | | | |
| 7 | MSB | | | | | | | |
| 8 | Transfer Length | | | | | | | LSB |
| 9 | Vendor specific | | Reserved | | | NBCA | Flag | Link |
| 10 | PAD | | | | | | | |
| 11 | | | | | | | | |

| byte \ bit | 7 | 6 | 5 | 4 | 3 | 2 | 1 | 0 |
|---|---|---|---|---|---|---|---|---|
| 0 | Operation code(2Ah) | | | | | | | |
| 1 | LUN(Obolute) | | | DPO(0) | FUA | EBP | Reserved | RelAdr |
| 2 | MSB | | | | | | | |
| 3 | Logical Block Address | | | | | | | |
| 4 | | | | | | | | |
| 5 | | | | | | | | LSB |
| 6 | Reserved | | | | | | | |
| 7 | MSB | | | | | | | |
| 8 | Transfer Length | | | | | | | LSB |
| 9 | Vendor specific | | Reserved | | | NBCA | Flag | Link |
| 10 | PAD | | | | | | | |
| 11 | | | | | | | | |

FIG. 6

| byte \ bit | 7 | 6 | 5 | 4 | 3 | 2 | 1 | 0 |
|---|---|---|---|---|---|---|---|---|
| 0 | \multicolumn{8}{c}{Operation code(28h)} |||||||| |
| 1 | \multicolumn{3}{c}{LUN(0bolute)} ||| DPO(0) | FUA | \multicolumn{2}{c}{Reserved} || RelAdr |
| 2 | MSB | | | | | | | |
| 3 | \multicolumn{8}{c}{Logical Block Address} |||||||| |
| 4 | | | | | | | | |
| 5 | | | | | | | | LSB |
| 6 | \multicolumn{8}{c}{Reserved} |||||||| |
| 7 | MSB | | | | | | | |
| 8 | \multicolumn{8}{c}{Transfer Length} |||||||| LSB |
| 9 | \multicolumn{3}{c}{DCF} ||| \multicolumn{2}{c}{Reserved} || NBCA | Flag | Link |
| 10 | \multicolumn{8}{c}{PAD} |||||||| |
| 11 | | | | | | | | |

FIG. 7

| byte \ bit | 7 | 6 | 5 | 4 | 3 | 2 | 1 | 0 |
|---|---|---|---|---|---|---|---|---|
| 0 | \multicolumn{8}{c}{Operation code(2Ah)} |||||||| |
| 1 | \multicolumn{3}{c}{LUN(0bolute)} ||| DPO | FUA | EBP | Reserved | RelAdr |
| 2 | MSB | | | | | | | |
| 3 | \multicolumn{8}{c}{Logical Block Address} |||||||| |
| 4 | | | | | | | | |
| 5 | | | | | | | | LSB |
| 6 | \multicolumn{8}{c}{Reserved} |||||||| |
| 7 | MSB | | | | | | | |
| 8 | \multicolumn{8}{c}{Transfer Length} |||||||| LSB |
| 9 | \multicolumn{3}{c}{DCF} ||| \multicolumn{2}{c}{Reserved} || NBCA | Flag | Link |
| 10 | \multicolumn{8}{c}{PAD} |||||||| |
| 11 | | | | | | | | |

…

METHOD AND APPARATUS FOR COPYING/MOVING DATA ON OPTICAL RECORDING MEDIUM

This application claims the benefit of the Korean Application No. P2000-83091 filed on Dec. 17, 2000, which is hereby incorporated by reference.

BACKGROUND OF THE INVENTION

1. Field of the Invention

The present invention relates to a rewritable optical recording medium system, and more particularly, to a method and apparatus for copying/moving data on an optical recording medium.

2. Discussion of the Related Art

Generally, an optical recording medium, i.e., an optical recording/reproducing apparatus serves to reproduce data recorded on an optical disc such as a compact disc (CD) and a digital versatile disc (DVD) or to record the data on the disc.

The DVD is similar to the CD in its principle. That is, the DVD recognizes data in the same manner as the CD that recognizes difference in the quantity of light, which is reflected through a laser, as data of 0 and 1. The DVD is different from the CD in that it stores data more finely than the CD.

FIG. 1 is a block diagram illustrating a related art optical recording/reproducing apparatus that can record and reproduce data on an optical disc. Referring to FIG. 1, an optical pickup 102 places light beams focused on an object lens on a signal track of an optical disc 101 under the control of a servo controller 106. The optical pickup 102 focuses incident light reflected on a signal recording plane on the object lens and then enters into an optical detector (not shown) to detect a focus error signal and a tracking error signal.

The optical detector includes a plurality of optical detecting elements. An electrical signal proportional to the quantity of light obtained from each optical detecting element is output to an RF and servo error generator 104. The RF and servo error generator 104 detects an RF signal for reproducing data from the electrical signal output from the optical detector, a focus error (FE) signal for servo control, and a tracking error (TE) signal. At this time, the RF signal is output to a decoder 105, the servo error signal such as FE and TE is output to the servo controller 106, and the control signal for recording data is output to an encoder 103.

The encoder 103 encodes to-be-recorded data in a recording pulse of a format required by the optical disc 101 and records the data in the optical disc 101 through the optical pickup 102. The decoder 105 restores the RF signal to the original data.

The servo controller 106 processes the focus error signal and outputs a driving signal for focus control to a focus servo driver 107. The servo controller 106 also processes the tracking error signal and outputs a driving signal for tracking control to a tracking servo driver 108.

At this time, the focus servo driver 107 moves the optical pickup 102 up and down by driving a focus actuator in the optical pickup 102, so that the optical disc 101 rotates to trace a predetermined track.

The tracking servo driver 108 moves the object lens of the optical pickup 102 in a radial direction by driving a tracking actuator in the optical pickup 102, so that the position of beams is corrected to trace a predetermined track.

In case of a normal recording/reproducing operation or fine seek, the tracking actuator is driven through the tracking servo driver 108 to move the object lens of the optical pickup in a radial direction. Meanwhile, in case of rough seek which requires to move the optical pickup, a sled servo driver 109 directly feeds the optical pickup in a desired direction by driving a sled motor 110 under the control of a sled control signal from the servo controller 106.

The servo controller 106 detects rotation speed data from the RF signal and outputs the detected data to the spindle driver 113. The spindle driver 113 rotates the disc 101 by controlling a spindle motor 114 in accordance with the rotation speed data through a phase locked loop (PLL).

A host may be connected to the aforementioned optical recording/reproducing apparatus, as shown in FIG. 2. A personal computer (PC) may be used as the host. The optical recording/reproducing apparatus is supported by the PC.

The host transmits write/read commands as shown in FIGS. 3 and 4 to a microprocessor 112 through an interface 111 of the optical recording/reproducing apparatus in case of recording/reproducing operation. The host transmits the to-be-recorded data to the encoder 103, and receives the reproduced data from the decoder 105. The microprocessor 112 controls the encoder 103, the decoder 105, and the servo controller 106 in accordance with the write/read commands of the host.

At this time, Advanced Technology Attached Packet Interface (ATAPI) is generally used as the interface 111. The ATAPI means the interface standard between an optical recording/reproducing apparatus such as a CD or a DVD and a host and has been supposed to transmit data decoded by the optical recording/reproducing apparatus to the host. The ATAPI serves to convert the decoded data to a protocol of packet type data that can be processed by the host.

FIG. 3 illustrates an example of a general read command format that outputs data from the host to the optical recording/reproducing apparatus of FIG. 1 in case where the data is reproduced from the optical disc. FIG. 4 illustrates an example of a write command format that outputs data from the host to the optical recording/reproducing apparatus of FIG. 1 in case where the data is recorded in the optical disc.

The read/write commands include a logical block address (LBA) designating a read or write position and a transfer length indicative of the following data size.

As an example, if the to-be-recorded data is generated in the optical recording apparatus, the host transmits the write command as shown in FIG. 4 to the microprocessor 112 of the optical recording apparatus through the interface 111. Subsequently, the host transmits the to-be-recorded data to the encoder 103 of the optical recording apparatus through the interface 111. Once the to-be-recorded data is input from the host to the optical disc 101, the optical recording apparatus starts to record the data from the designated LBA.

Meanwhile, the optical recording/reproducing apparatus may move or copy the data (or information) recorded in one area of the optical disc 101 to and in another area thereof. In this case, the read command and the write command are all required.

FIG. 2 illustrates a related art method for moving or copying data in a disc.

Referring to FIG. 2, the host generates a read command as shown in FIG. 3 and outputs the read command to the microprocessor 112 of the optical recording/reproducing apparatus. The optical recording/reproducing apparatus reads data from the LBA in the optical disc 101 designated by the read command by the transmission length and stores the read data in its memory (not shown).

Then, the optical recording/reproducing apparatus reads the data stored in the memory and transmits the data to the host. The host stores the transmitted data in its memory and then reads the stored data to transmit the same along with the write command to the optical recording/reproducing apparatus.

Then, the optical recording/reproducing apparatus stores again the data transmitted from the host in the memory allocated thereto and records the data by the transmission length in a destination recording position (i.e., LBA) in the optical disc 101, which is designated by the write command. That is, the optical recording/reproducing apparatus performs a recording operation on a surface of the optical disc by accessing a recording position (i.e., copy or movement position) designated by the write command.

The aforementioned related art optical recording/reproducing apparatus stores the data read from the optical disc in its memory and then transmits the data to the host to store the same in the memory of the host. The host reads the data stored in its memory and transmits the data along with the write command to the optical recording/reproducing apparatus so that the data is stored in the memory of the optical recording/reproducing apparatus, thereby recording the data in an actual moving or copying position.

In this case, an unnecessary data flow exists in the related art optical recording/reproducing apparatus.

In other words, the data read from the optical disc is transmitted to the host so that the data is stored in the memory of the host. This makes the memory of the optical recording apparatus unnecessary and requires the steps of receiving the same data as that required during the reproducing operation from the host and storing the data in the memory. For this reason, when the data moves or copies in one disc, data transmission time becomes long. Particularly, when several read and write commands occur in one file or recorded data, the optical disc should physically be accessed several times to read/write the data. In this case, problems arise in that it takes long time to move and copy the data, and power consumption increases.

SUMMARY OF THE INVENTION

Accordingly, the present invention is directed to a method and apparatus for copying/moving data on an optical recording medium that substantially obviates one or more problems due to limitations and disadvantages of the related art.

An object of the present invention is to provide a method and apparatus for copying/moving data on an optical recording medium, in which unnecessary data movement is removed when data moves or copies in one optical disc, and actual access number of times of the optical disc can be reduced, thereby quickly and efficiently moving and copying the data in one optical disc.

Another object of the present invention is to provide a method and apparatus for copying/moving data on an optical recording medium, in which data transmission to a host is omitted when the data moves or copies in one optical disc.

Other object of the present invention is to provide a method and apparatus for copying/moving data on an optical recording medium, in which identification information is assigned to a reserved area of read/write commands generated from a host to display data movement status or data copying status, thereby omitting data transmission to the host when the data moves or copies in one optical disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for copying/moving data on an optical recording medium includes the steps of: reading the data from a corresponding position on the optical recording medium designated by a read command by a transmission length if the read command is transmitted from a controller (for example, host) to an optical recording/reproducing apparatus, and storing the read data in a memory of the optical recording/reproducing apparatus; and reading the data stored in the memory if the write command is input from the controller, and recording the read data by the transmission length in a corresponding write position on the optical recording medium designated by the write command.

The read command has an identification information area with identification information displaying whether the data moves or copies in one optical recording medium.

The read data on the optical recording medium is not transmitted to the controller if the identification information displays that the data moves or copies on one optical recording medium.

The write command has an identification information area with identification information displaying whether the data moves or copies in one optical recording medium.

The data to be recorded on the optical recording medium is not transmitted to the controller if the identification information displays that the data moves or copies on one optical recording medium.

In another aspect of the present invention, an apparatus for copying/moving data on an optical recording medium includes: a host assigning an identification information area to a reserved area in write/read commands that record/reproduce data and transmitting identification information that displays whether the data moves or copies in one optical recording medium to the reserved area; and an optical recording/reproducing apparatus reading data in a corresponding read position on the optical recording medium designated by the read command if the identification information in the read command transmitted from the host displays that the data moves or copies in one optical recording medium, so as to store the read data in its memory, and then reading the data stored in the memory if the identification information in the write command transmitted from the host displays that the data moves or copies in one optical recording medium, so as to record the read data in a corresponding write position on the optical recording medium designated by the write command.

If the host generates several read/write commands in one file and transmits them to the optical recording/reproducing apparatus, the optical recording/reproducing apparatus continuously stores the read data in the position designated by the read command in its memory while the read command with the identification information set at 1 is transmitted from the host, stores a recording position designated by the write command in a predetermined area of the memory if the original write command with the identification information set at 1 is transmitted from the host, reads the data stored in the memory if the read command with the identification information set at 0 is transmitted from the host, and sequentially records the read data in the recording position on the optical recording medium stored in the predetermined area of the memory.

If the host generates several read/write commands in one file and transmits them to the optical recording/reproducing apparatus, the optical recording/reproducing apparatus continuously stores the read data in the position designated by the read command in its memory while the read command with the identification information set at 1 is transmitted from the host, stores a recording position and transmission length information designated by the write command in a predetermined area of the memory while the write command with the identification information set at 1 is transmitted from the host, reads the data stored in the memory if the read or write command with the identification information set at 0 is transmitted from the controller, and records the read data on the optical recording medium using the stored recording position and the transmission length information.

The optical recording/reproducing apparatus determines whether the recording position has continuity when recording the data on the optical recording medium, and sequentially records the data read from the memory in the recording position on the optical recording medium designated by the original write command with the identification information set at 1 if it is determined that the recording position has continuity.

The optical recording/reproducing apparatus records the data read from the memory on the optical recording medium in accordance with the stored recording position and the transmission length whenever the write command with the identification information set at 1 if it is determined that the recording position does not have continuity.

In another aspect of the present invention, an apparatus for copying/moving data on an optical recording medium includes: a host assigning an identification information area to a reserved area in write/read commands that record/reproduce data and transmitting identification information that displays whether the data moves or copies in one optical recording medium to the reserved area; and an optical recording/reproducing apparatus continuously storing data read in a position designated by the read command in its memory while the read command with the identification information set at 1 is transmitted from the host, if the host generates several read/write commands in one file and transmits them to the optical recording/reproducing apparatus, storing a recording position and transmission length information designated by the write command in a predetermined area of the memory while the write command with the identification information set at 1 is transmitted from the host, reading the data stored in the memory if the read or write command with the identification information set at 0 is transmitted from the host, and recording the read data on the optical recording medium using the stored recording position and the transmission length information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates an example of a read command format according to the present invention;

FIG. 7 illustrates an example of a write command format according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
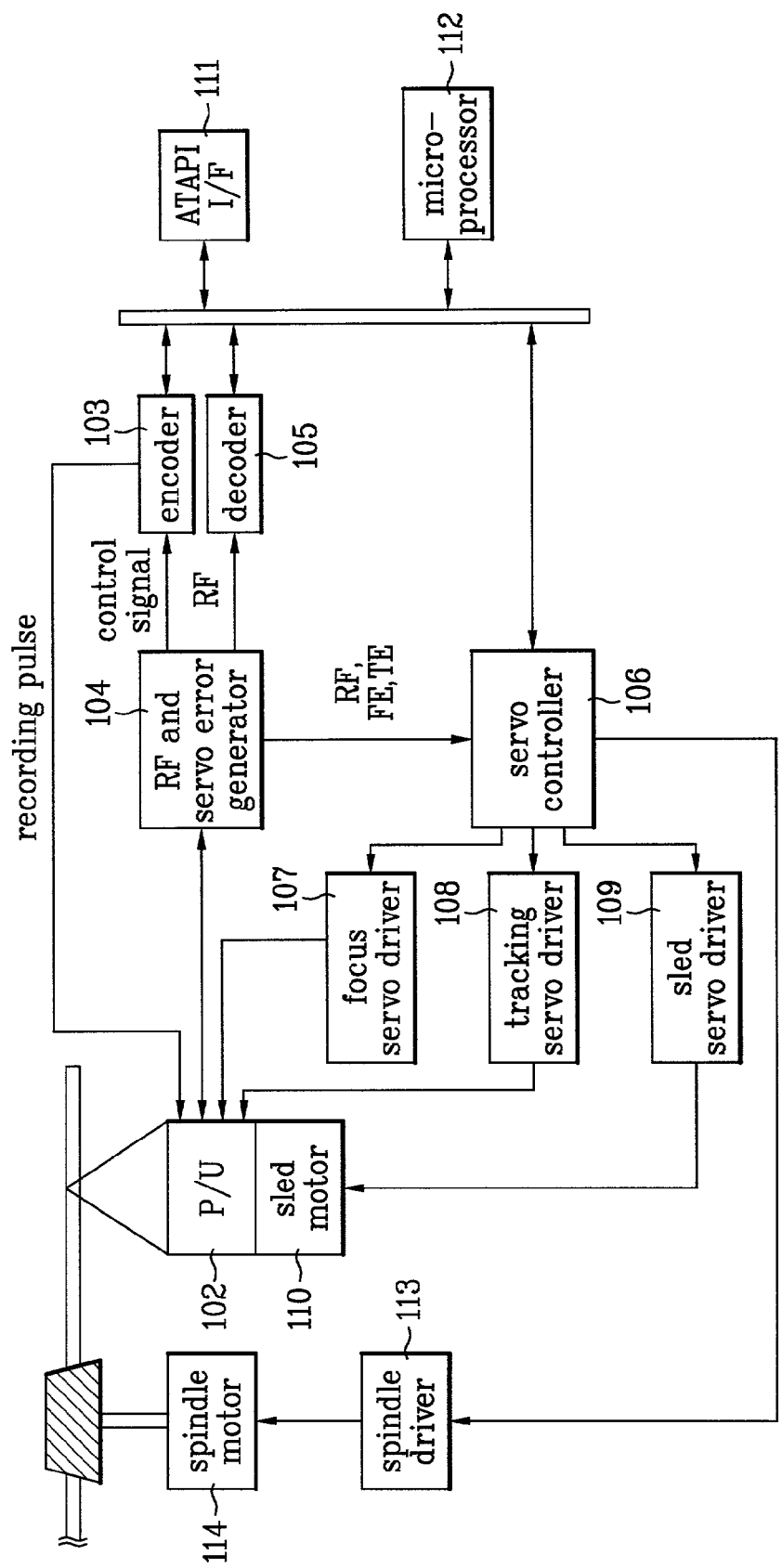
FIG. 1 is a block diagram illustrating a structure of a general optical disc.
Figures 2, 3:
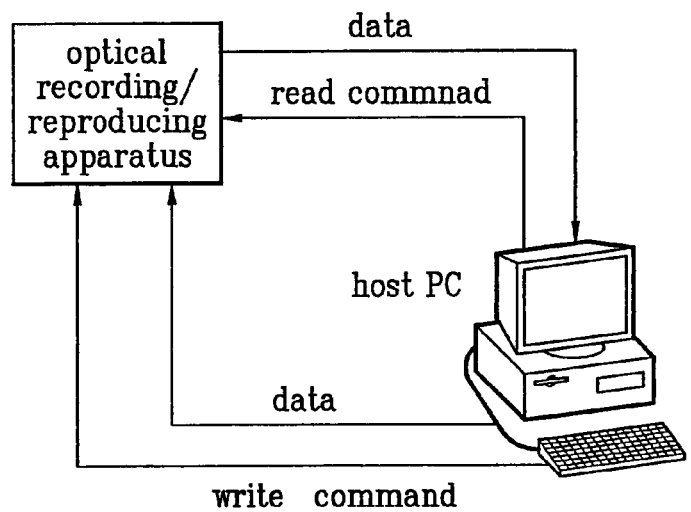
FIG. 2 illustrates related art data transmission steps between an optical recording/reproducing apparatus and a host when data moves or copies on one optical disc.
FIG. 3 illustrates an example of a general read command format.
Figures 4, 5:
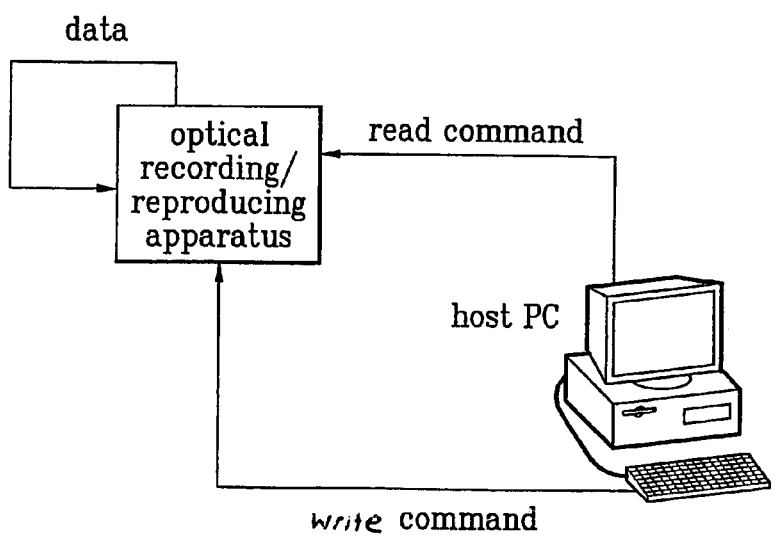
FIG. 4 illustrates an example of a general write command format.
FIG. 5 illustrates data transmission steps between an optical recording/reproducing apparatus and a host when data moves or copies on one optical disc.

FIG. 5 illustrates data transmission steps and read/write commands between an optical recording/reproducing apparatus and a host when data moves or copies on one optical disc.

FIG. 6 illustrates an example of a read command format of FIG. 5, and FIG. 7 illustrates an example of a write command format of FIG. 5. Referring to FIGS. 6 and 7, the read command and the write command are partially corrected to inform data movement within one disc.

In other words, in the present invention, a flag for identification information is assigned to the existing read/write command system to maintain compatibility with the existing read/write command system. For convenience, the flag is called a direct copy flag (DCF).

The DCF is assigned to a reserved area of the read/write commands. As an example, in FIGS. 6 and 7, the DCF is assigned to a reserved area such as a vendor specific option area in a bit number 7 of a byte number 9. Also, the DCF may be assigned to anywhere within the reserved area of the read/write commands.

In more detail, in case where data moves or copies within one disc, the host displays the data movement or copy in the DCF of the read/write commands and transmits the same to the optical recording/reproducing apparatus. Also, once the reading/writing operations of one file or the data to move or copy are completed, the host resets the DCF to transmit the data to the optical recording/reproducing apparatus.

Therefore, once the read command with the DCF set at 1 is input, the optical recording/reproducing apparatus reads the data in a corresponding position of an optical disc 101 designated by the read command and stores the read data in its memory. However, the optical recording/reproducing apparatus does not transmit the data to the host.

Once the write command with the DCF set at 1 is input from the host, the optical recording/reproducing apparatus reads the data stored in its memory and records the data in a corresponding position of the optical disc 101 designated by the write command. By doing so, the step of transmitting the data stored in the memory of the optical recording/reproducing to the host can be omitted, thereby reducing the required time therefor. That is, it is possible to reduce time required to move or copy the data.

Figure 8:
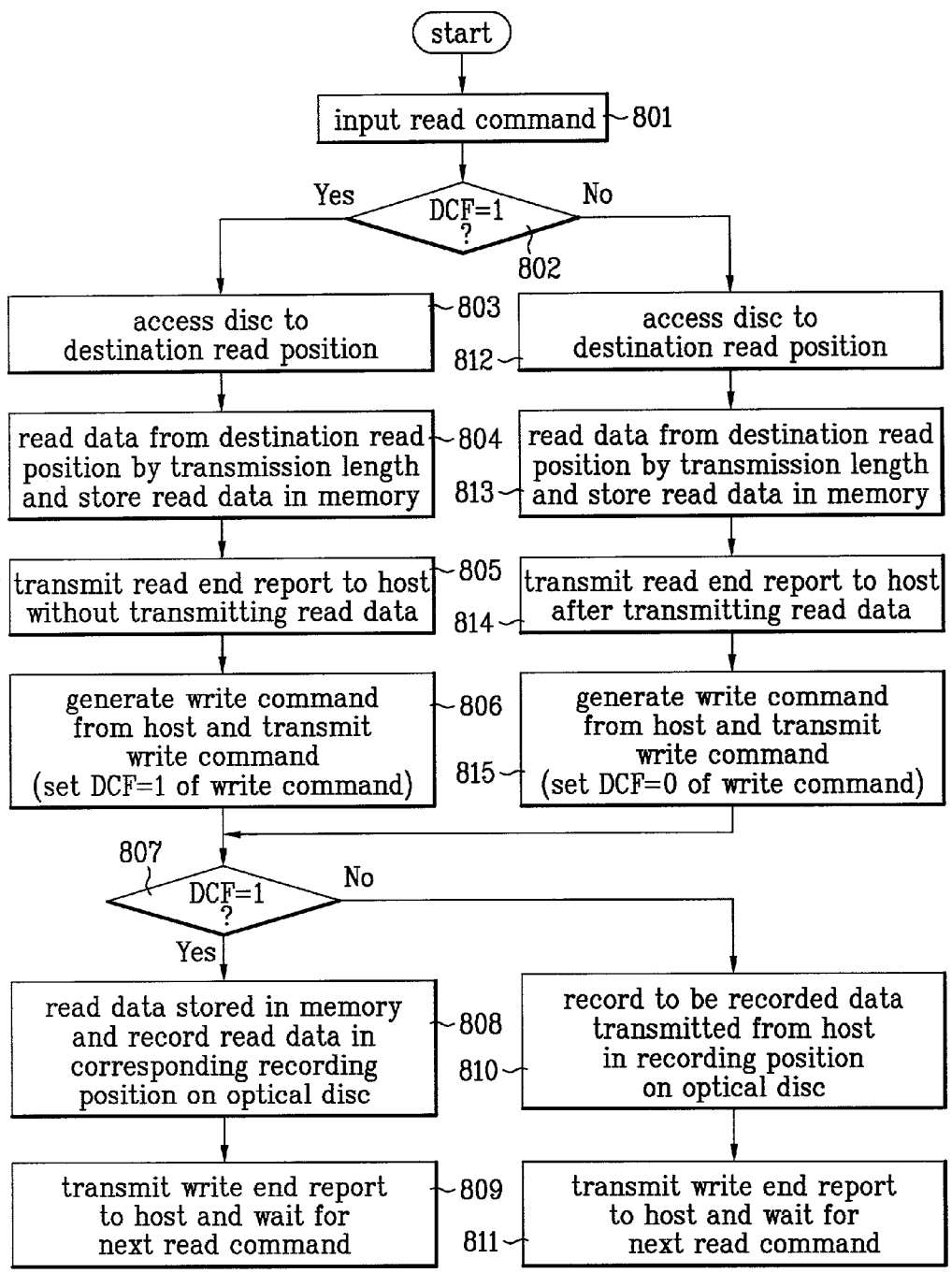
FIG. 8 is a flow chart illustrating a method for copying and moving data on an optical disc according to the present invention.

FIG. 8 is a flow chart illustrating the operation of the optical recording/reproducing apparatus according to the present invention, in which the data moves or copies in one disc in response to the read/write commands.

Once it is required to move or copy the data in one disc, the host sets the DCF of the read command at 1. In other cases, the host resets the same at 0.

Therefore, once the read command is input (in step 801), the optical recording/reproducing apparatus checks whether the DCF is set at 1 (in step 802). In case where the DCF of the read command is set at 1, the data read from the optical disc is not transmitted to the host. That is, the data moves or copies in one disc.

In the step 802, once the DCF is set at 1, the optical recording/reproducing apparatus accesses the optical disc 101 to a corresponding read position, i.e., LBA designated by the read command (in step 803). The data is read from the read position by a transmission length designated by the read command and then stored in the memory of the optical recording/reproducing apparatus (in step 804). At this time, the read data is not transmitted to the host, and a read end report is only transmitted to the host (in step 805).

Once the read end report is transmitted to the host, the host generates the write command and transmits the same to the optical recording/reproducing apparatus (in step 806). At this time, the DCF of the write command is set at 1. Accordingly, if it is determined that the DCF of the write command is set at 1 in step 807, the optical recording/reproducing apparatus reads the data stored in the memory by the transmission length from the corresponding recording position on the optical disc designated by the write command and then records the data (in step 808). Then, the optical recording/reproducing apparatus transmits a write end report to the host and waits for the next read command from the host (in step 809). That is, the optical recording/reproducing apparatus does not receive the data from the host even if the write command is input thereto.

However, if it is determined that the DCF of the write command is reset at 0 in step 807, the optical recording/reproducing apparatus receives the data to be recorded from the host. The optical recording/reproducing apparatus records the data received from the host by the transmission length in the corresponding recording position of the optical disc designated by the write command (in step 810). Then, the optical recording/reproducing apparatus transmits the write end report to the host and waits for the next read command from the host (in step 811).

Meanwhile, in the step 802, if it is determined that the DCF of the read command is reset at 0, the optical recording/reproducing apparatus accesses the optical disc 101 to a corresponding read position, i.e., LBA designated by the read command (in step 812). The optical recording/reproducing apparatus reads the data from the read position by the transmission length designated by the read command and stores the read data in its memory to transmit the data to the host (in step 813). At this time, the optical recording/reproducing apparatus transmits the read end report to the host.

Once the read end report is transmitted to the host, the host generates the write command and transmits the same to the optical recording/reproducing apparatus. At this time, the DCF of the write command is set at 0. Accordingly, if it is determined that the DCF of the write command is set at 0 in step 807, the optical recording/reproducing apparatus receives the to-be-recorded data from the host together with the write command and records the data by the transmission length in the corresponding recording position on the optical disc designated by the write command (in step 810). Then, the optical recording/reproducing apparatus transmits a write end report to the host and waits for the next read command from the host (in step 811).

At this time, the transmission length of the read or write command should be considered. As an example, if one file moves or copies in one disc, the read/write commands may occur one time or several times depending on the file length or the transmission length designated within the read/write commands. The read command and the write command occur alternately. If the transmission length set within once read/write commands is smaller than the data length, for example, if the read/write commands occur several times because of the short transmission length required to move or copy one file, it is necessary to alternately access an originally recorded data area and a to-be-newly recorded data area. This may cause the system overload. This problem occurs in the related art method, likewise.

Figure 9:
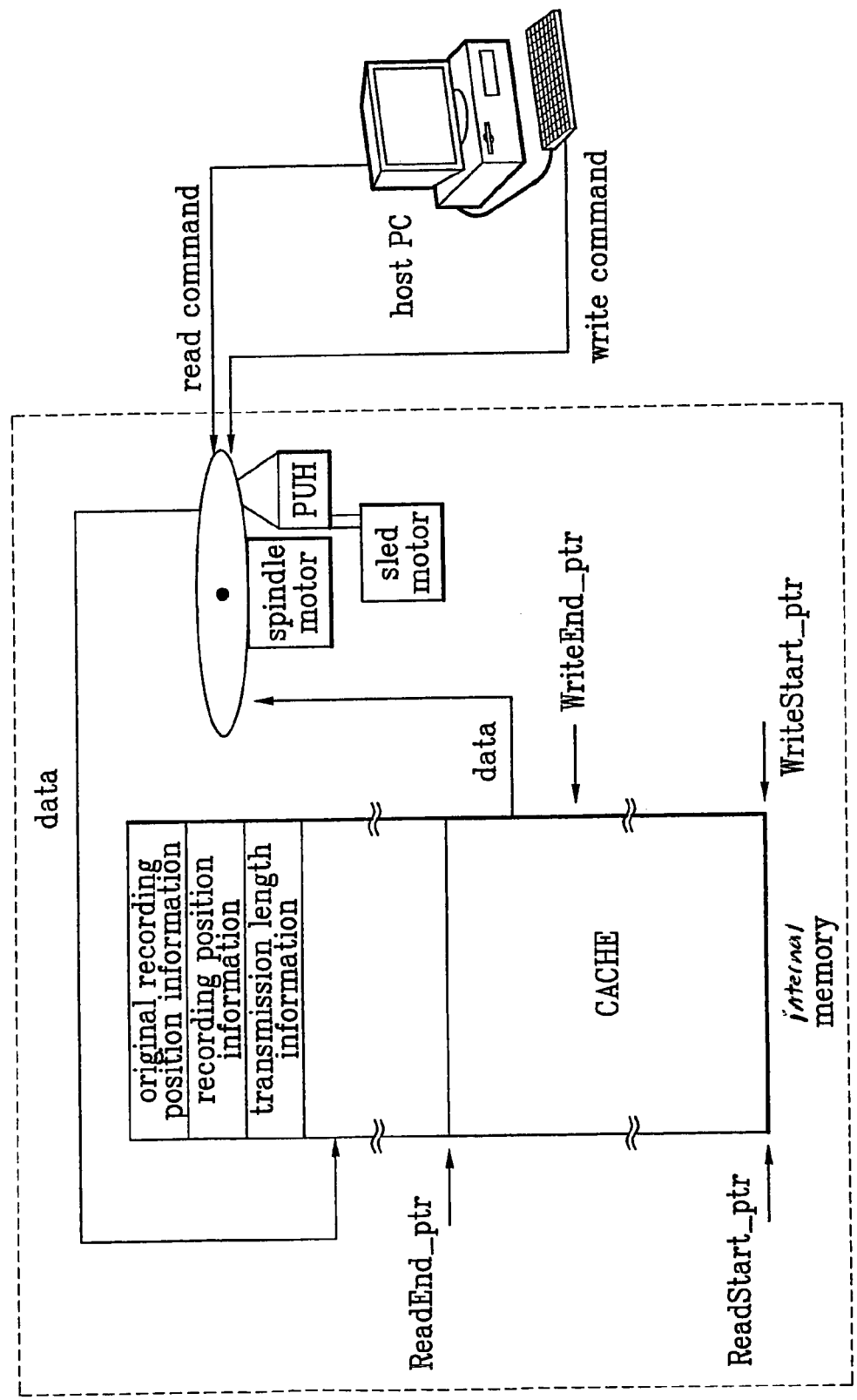
FIG. 9 illustrates data transmission steps between the optical recording/reproducing apparatus and the host and a storage status when data moves or copies on one optical disc.

To solve this problem, in the present invention, as shown in FIG. 9, a separate area is set in the memory of the optical recording/reproducing apparatus to store the read data therein. In the present invention, the separate area is called a cache area for convenience.

Once the read command with the DCF set at 1 is input, the data read from the optical disc 101 is stored in the cache area while the write operation is not implemented even if the write command with the DCF set at 1 is input. This operation continues until the data is fully stored in the cache area or the DCF is reset at 0 by the read command. If the data is fully stored in the cache area or if the DCF is reset at 0 by the read command, the data is read from the cache area by either the size of the cache area or a total length to be written, so that the data is recorded in a corresponding position of the optical disc.

At this time, several read/write commands occur in one file, the recording position designated by the write command may have continuity or discontinuity. That is, the recording position in one file may be continuous or discontinuous. In particular, if the recording position is discontinuous, there may be a defect in the corresponding position or other data may be recorded therein.

Therefore, once the original write command with the DCF set at 1 is input, the optical recording/reproducing apparatus stores the original recording position (LBA) designated by the write command in a predetermined area of the memory. Afterwards, the optical recording/reproducing apparatus stores the LBA and the transmission length in the predetermined area of the memory whenever the write command with the DCF set at 1 is transmitted thereto.

Then, once the DCF is reset at 0 by the read command or the data is fully recorded in the cache area, the optical recording/reproducing apparatus starts to check whether the recording position is continuous or discontinuous. If the recording position is continuous, the optical recording/reproducing apparatus reads the data stored in the memory and sequentially records the data from the original recording position. While, if the recording position is discontinuous, the optical recording/reproducing apparatus repeatedly stores the data by the transmission length from the recording position whenever the write command is transmitted.

There may exist various methods for checking the continuity. As an example, the continuity can be checked by checking the write command and the transmission length during one file.

If the read/write commands occur several times in one file, the steps 801 to 809 of FIG. 8 repeat until the number of the read commands or the cache area becomes full. In this case, the optical recording/reproducing apparatus stores the transmission length and the recording position designated by the write command while it does not record the data on the optical disc even if the write command set with the DCF set at 1 is input. In the final write command, the optical recording/reproducing apparatus resets the DCF and then reads the data stored in its memory to record the read data in the optical disc. At this time, the optical recording/reproducing apparatus checks whether the write command is continuous or discontinuous and performs the resultant recording operation.

As aforementioned, the method and apparatus for copying/moving data on an optical recording medium according to the present invention has the following advantages.

Data transmission to a host is omitted when the data moves or copies in one optical disc. To this end, identification information is assigned to the reserved area of the read/write commands generated from the host, thereby displaying data movement status or data copying status. Thus, it is possible to reduce the data transmission time when the data moves or copies in one disc. Furthermore, even if the read/write commands in one file or the whole data to move or copy occur several times, the data transmission time such as the data movement time and the data copying time can be reduced by reducing the number of physical access times of the optical disc for the data reading/writing operation. As a result, power consumption can be reduced while durability of the system can be improved.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for copying/moving data on an optical recording medium, the optical recording medium including a controller transmitting read/write commands with a read or write position and a transmission length when the data moves or copies in one optical disc, and an optical recording/reproducing apparatus reproducing and recording the data on the optical recording medium by receiving the read/write commands from the controller, the method comprising:

reading the data from a corresponding position on the optical recording medium designated by the read command by a transmission length if the read command is transmitted from the controller to the optical recording/reproducing apparatus, and storing the read data in a memory of the optical recording/reproducing apparatus; and reading the data stored in the memory if the write command is input from the controller, and recording the read data by the transmission length in a corresponding write position on the optical recording medium designated by the write command, wherein, if the controller generates several read/write commands in one file and transmits the several read/write commands to the optical recording/reproducing apparatus, further comprising the steps of:

continuously storing the read data in the position designated by the read command in the memory of the optical recording/reproducing apparatus while a read command with the identification information set at 1 is transmitted from the controller;

storing a recording position designated by the write command in a predetermined area of the memory if the original write command with the identification information set at 1 is transmitted from the controller;

reading the data stored in the memory if the read command with the identification information set at 0 is transmitted from the controller; and recording the read data in a recording position on the optical recording medium stored in the predetermined area of the memory.

2. The method of claim 1, wherein the read command has an identification information area with identification information displaying whether the data moves or copies in one optical recording medium.

3. The method of claim 2, wherein the identification information area is assigned to a reserved area in the read command.

4. The method of claim 2, wherein the read data on the optical recording medium is not transmitted to the controller if the identification information displays that the data moves or copies on one optical recording medium.

5. The method of claim 1, wherein the write command has an identification information area with identification information displaying whether the data moves or copies in one optical recording medium.

6. The method of claim 5, wherein the identification information area is assigned to a reserved area in the write command.

7. The method of claim 5, wherein the data to be recorded on the optical recording medium is not received from the controller if the identification information displays that the data moves or copies on one optical recording medium.

8. The method of claim 1, if the controller generates several read/write commands in one file and transmits them to the optical recording/reproducing apparatus, further comprising the steps of:

continuously storing the read data in the position designated by the read command in the memory of the optical recording/reproducing apparatus while the read command with the identification information set at 1 is transmitted from the controller;

storing a recording position and transmission length information designated by the write command in a predetermined area of the memory while the write command with the identification information set at 1 is transmitted from the controller;

reading the data stored in the memory if the read or write command with the identification information set at 0 is transmitted from the controller; and recording the read data on the optical recording medium using the stored recording position and the transmission length information.

9. The method of claim 8, wherein the recording step includes the steps of:

determining whether the recording position has continuity when the data is recorded on the optical recording medium; and sequentially recording the data read from the memory in the recording position on the optical recording medium designated by the original write command with the identification information set at 1 if it is determined that the recording position has continuity.

10. The method of claim 9, wherein the recording step includes the step of recording the data read from the memory on the optical recording medium in accordance with the stored recording position and the transmission length whenever the write command with the identification information set at 1 if it is determined that the recording position does not have continuity.

11. An apparatus for copying/moving data on an optical recording medium, comprising:
a host assigning an identification information area to a reserved area in write/read commands that record/reproduce data and transmitting identification information that displays whether the data moves or copies in one optical recording medium to the reserved area; and
an optical recording/reproducing apparatus reading data in a corresponding read position on the optical recording medium designated by the read command if the identification information in the read command transmitted from the host displays that the data moves or copies in one optical recording medium, so as to store the read data in its memory, and then reading the data stored in the memory if the identification information in the write command transmitted from the host displays that the data moves or copies in one optical recording medium, so as to record the read data in a corresponding write position on the optical recording medium designated by the write command,
wherein, if the host generates several read/write commands in one file and transmits them to the optical recording/reproducing apparatus, the optical recording/reproducing apparatus continuously stores the read data in the position designated by the read command in its memory while the read command with the identification information set at 1 is transmitted from the host, stores a recording position designated by the write command in a predetermined area of the memory if the original write command with the identification information set at 1 is transmitted from the host, reads the data stored in the memory if the read command with the identification information set at 0 is transmitted from the host, and sequentially records the read data in the recording position on the optical recording medium stored in the predetermined area of the memory.

12. The apparatus of claim 11, wherein the optical recording/reproducing apparatus does not transmit the data read on the optical recording medium to the host if the identification information in the read command displays that the data moves or copies on one optical recording medium.

13. The apparatus of claim 11, wherein the optical recording/reproducing apparatus does not receive the data to be recorded on the optical recording medium from the host if the identification information in the write command displays that the data moves or copies on one optical recording medium.

14. The apparatus of claim 11, wherein, if the host generates several read/write commands in one file and transmits them to the optical recording/reproducing apparatus, the optical recording/reproducing apparatus continuously stores the read data in the position designated by the read command in its memory while the read command with the identification information set at 1 is transmitted from the host, stores a recording position and transmission length information designated by the write command in a predetermined area of the memory while the write command with the identification information set at 1 is transmitted from the host, reads the data stored in the memory if the read or write command with the identification information set at 0 is transmitted from the controller, and records the read data on the optical recording medium using the stored recording position and the transmission length information.

15. The apparatus of claim 14, wherein the optical recording/reproducing apparatus determines whether the recording position has continuity when recording the data on the optical recording medium, and sequentially records the data read from the memory in the recording position on the optical recording medium designated by the original write command with the identification information set at 1 if it is determined that the recording position has continuity.

16. The apparatus of claim 15, wherein the optical recording/reproducing apparatus records the data read from the memory on the optical recording medium in accordance with the stored recording position and the transmission length whenever the write command with the identification information set at 1 if it is determined that the recording position does not have continuity.

17. An apparatus for copying/moving data on an optical recording medium, comprising:
a host assigning an identification information area to a reserved area in write/read commands that record/reproduce data and transmitting identification information that displays whether the data moves or copies in one optical recording medium to the reserved area; and
an optical recording/reproducing apparatus continuously storing data read in a position designated by the read command in its memory while the read command with the identification information set at 1 is transmitted from the host, if the host generates several read/write commands in one file and transmits them to the optical recording/reproducing apparatus, storing a recording position and transmission length information designated by the write command in a predetermined area of the memory while the write command with the identification information set at 1 is transmitted from the host, reading the data stored in the memory if the read or write command with the identification information set at 0 is transmitted from the host, and recording the read data on the optical recording medium using the stored recording position and the transmission length information.

18. The apparatus of claim 17, wherein the optical recording/reproducing apparatus determines whether the recording position has continuity when recording the data on the optical recording medium, and sequentially records the data read from the memory in the recording position on the optical recording medium designated by the original write command with the identification information set at 1 if it is determined that the recording position has continuity.

19. The apparatus of claim 18, wherein the optical recording/reproducing apparatus records the data read from the memory on the optical recording medium in accordance with the stored recording position and the transmission length whenever the write command with the identification information set at 1 if it is determined that the recording position does not have continuity.

20. A method for copying/moving data on an optical recording medium; the method comprising:
receiving a read command, the read command including a logical block address to designate a position of data to be read, a transfer length to represent a length of data to be read, and an identification information to indicate whether a mode for copying or moving data is active;
reading the data from the optical recording medium based on the read command, and storing the read data in a memory;

receiving a write command, the write command including a logical block address to designate a position of data to be written, a transfer length to represent a length of data to be written, and an identification information to indicate whether a mode for copying or moving data is active; and reading the data stored in the memory based on the write command, and recording the read data in a position designated by the logical block address of the write command.

21. An apparatus for copying/moving data on an optical recording medium, comprising:

a controller transmitting write/read commands to record/reproduce data, the write/read commands including a logical block address to designate a position of data to be written or read, a transfer length to represent a length of data to be written or read, and identification information to indicate whether to copy or move the data recorded in the optical recording medium to other area; and an optical recording/reproducing apparatus reading data in a position designated by the read command if the identification information in the read command transmitted from the controller indicates that a copying or moving of the data is active, so as to store the read data in its memory, and then reading the data stored in the memory if the identification information in the write command transmitted from the controller indicates that the copying or moving of the data is inactive, so as to record the read data in a position designated by the logical block address of the write command.

* * * * *